(12) United States Patent
Hauge et al.

(10) Patent No.: US 8,401,189 B2
(45) Date of Patent: *Mar. 19, 2013

(54) OPPORTUNISTIC USE OF KEYS DURING ENCRYPTION/DECRYPTION

(75) Inventors: Raymond C. Hauge, Fox River Grove, IL (US); Richard Lewis, Buffalo Grove, IL (US)

(73) Assignee: Zenith Electronics LLC, Lincolnshire, IL (US)

( * ) Notice: Subject to any disclaimer, the term of this patent is extended or adjusted under 35 U.S.C. 154(b) by 15 days.

This patent is subject to a terminal disclaimer.

(21) Appl. No.: 12/355,260

(22) Filed: Jan. 16, 2009

(65) Prior Publication Data

US 2009/0208009 A1    Aug. 20, 2009

Related U.S. Application Data

(62) Division of application No. 11/137,272, filed on May 25, 2005, now Pat. No. 8,189,786.

(51) Int. Cl.
*H04L 29/06* (2006.01)

(52) U.S. Cl. .......... 380/239; 713/189; 725/31; 380/200; 380/217; 380/278; 380/281; 380/284

(58) Field of Classification Search .................. 380/217, 380/239, 284, 278, 281, 200; 713/189; 725/3
See application file for complete search history.

(56) References Cited

U.S. PATENT DOCUMENTS

| | | | |
|---|---|---|---|
| 1,864,840 A | 6/1932 | Louis | |
| 4,691,610 A | 9/1987 | Gilbert | |
| 4,860,807 A | 8/1989 | Vacchiano | |
| 4,874,025 A | 10/1989 | Cleveland | |
| 4,974,651 A | 12/1990 | Carmon et al. | |
| 5,029,207 A | 7/1991 | Gammie | |
| 5,193,598 A | 3/1993 | Estrem | |
| 5,253,294 A | 10/1993 | Maurer | |
| 5,320,150 A | 6/1994 | Everts | |
| 5,420,866 A | 5/1995 | Wasilewski | |
| 5,421,231 A | 6/1995 | Break et al. | |
| 5,526,856 A | 6/1996 | Pedri | |
| 5,592,981 A | 1/1997 | Derecktor | |
| RE35,627 E | 10/1997 | Estrem | |
| 5,774,549 A | 6/1998 | Nielsen | |
| 5,822,430 A | 10/1998 | Doud | |
| 5,836,365 A | 11/1998 | Derecktor | |
| 5,841,873 A | 11/1998 | Lockhart et al. | |
| 5,844,478 A | 12/1998 | Blatter et al. | |
| 5,988,243 A | 11/1999 | Ayala et al. | |
| 6,016,348 A | 1/2000 | Blatter et al. | |
| 6,123,173 A | 9/2000 | Patros | |
| 6,179,024 B1 | 1/2001 | Yang | |

(Continued)

FOREIGN PATENT DOCUMENTS

| EP | 0 706 118 | 4/1996 |
|---|---|---|
| EP | 0786881 A2 | 12/1996 |

(Continued)

OTHER PUBLICATIONS

Qiao et al., "Comparison of MPEG Encryption Algorithms" Computers and Graphics, vol. 22, No. 4, pp. 437-448, 1998.

*Primary Examiner* — Jeffrey Pwu
*Assistant Examiner* — Hee Song

(57) ABSTRACT

An encrypted program received in an MPEG transport stream is decrypted by receiving a message in the MPEG transport stream, wherein the message contains a key, decrypting the encrypted program based on the key, and replacing the message in the MPEG transport stream with a null packet.

13 Claims, 11 Drawing Sheets

U.S. PATENT DOCUMENTS

| | | | |
|---|---|---|---|
| 6,199,608 B1 | 3/2001 | Ayala et al. | |
| 6,215,876 B1 | 4/2001 | Gilley | |
| 6,477,252 B1 | 11/2002 | Faber et al. | |
| 6,575,213 B1 | 6/2003 | Houk | |
| 6,650,869 B2 | 11/2003 | Kelly et al. | |
| 6,745,804 B2 | 6/2004 | Welsh et al. | |
| 6,771,657 B1 | 8/2004 | Elstermann | |
| 6,819,224 B2 | 11/2004 | Brierley | |
| 6,834,110 B1 | 12/2004 | Marconcini et al. | |
| 7,036,540 B2 | 5/2006 | Welsh | |
| 7,065,213 B2 | 6/2006 | Pinder | |
| 7,092,524 B1 | 8/2006 | Timmel | |
| 7,124,303 B2 | 10/2006 | Candelore et al. | |
| 7,137,025 B2 | 11/2006 | Ito et al. | |
| 7,151,832 B1 | 12/2006 | Fetkovich | |
| 7,203,311 B1 | 4/2007 | Kahn et al. | |
| 7,221,758 B2 | 5/2007 | Cramer et al. | |
| 7,242,772 B1 | 7/2007 | Tehranchi | |
| 7,254,232 B2 | 8/2007 | DiSanto et al. | |
| 7,336,787 B2 | 2/2008 | Unger et al. | |
| 7,356,147 B2 | 4/2008 | Foster et al. | |
| 7,366,302 B2 | 4/2008 | Candelore | |
| 7,401,232 B2 | 7/2008 | Ono et al. | |
| 7,406,703 B2 | 7/2008 | Lee et al. | |
| 7,463,582 B2 | 12/2008 | Kelly et al. | |
| 7,481,254 B2 | 1/2009 | Welsh | |
| 7,555,123 B2 | 6/2009 | Pinder et al. | |
| 7,747,853 B2 | 6/2010 | Candelore | |
| 2002/0064177 A1* | 5/2002 | Bertram et al. | 370/458 |
| 2002/0131595 A1 | 9/2002 | Ueda et al. | |
| 2003/0024604 A1 | 2/2003 | Derecktor | |
| 2003/0035543 A1 | 2/2003 | Gillon et al. | |
| 2003/0058810 A1 | 3/2003 | Petronic | |
| 2003/0059047 A1 | 3/2003 | Iwamura | |
| 2003/0110382 A1 | 6/2003 | Leporini et al. | |
| 2003/0135464 A1 | 7/2003 | Mourad et al. | |
| 2003/0159140 A1 | 8/2003 | Candelore | |
| 2003/0167397 A1* | 9/2003 | Mangold et al. | 713/189 |
| 2003/0169883 A1 | 9/2003 | Leroux et al. | |
| 2004/0052379 A1* | 3/2004 | Nishimoto et al. | 380/281 |
| 2004/0124036 A1 | 7/2004 | Ulshafter | |
| 2004/0136532 A1 | 7/2004 | Pinder et al. | |
| 2004/0141614 A1 | 7/2004 | Choi | |
| 2004/0148501 A1* | 7/2004 | Livaditis et al. | 713/161 |
| 2004/0165729 A1 | 8/2004 | Bisson et al. | |
| 2004/0181800 A1 | 9/2004 | Rakib et al. | |
| 2004/0240668 A1 | 12/2004 | Bonan et al. | |
| 2004/0268117 A1 | 12/2004 | Olivier et al. | |
| 2005/0006002 A1 | 1/2005 | Barclay de Tolly | |
| 2005/0097597 A1 | 5/2005 | Pedlow et al. | |
| 2005/0102498 A1 | 5/2005 | Bojinov et al. | |
| 2005/0194215 A1 | 9/2005 | Radermacher | |
| 2005/0259813 A1 | 11/2005 | Wasilewski et al. | |
| 2005/0259821 A1 | 11/2005 | Kubota et al. | |
| 2006/0002561 A1 | 1/2006 | Choi et al. | |
| 2006/0031873 A1* | 2/2006 | Fahrny et al. | 725/31 |
| 2006/0047953 A1 | 3/2006 | Beukema et al. | |
| 2006/0047975 A1 | 3/2006 | Beukema et al. | |
| 2007/0258586 A1 | 11/2007 | Huang et al. | |
| 2008/0198876 A1 | 8/2008 | Stranger et al. | |
| 2008/0256641 A1 | 10/2008 | Lo | |

FOREIGN PATENT DOCUMENTS

| | | |
|---|---|---|
| EP | 0926894 A1 | 6/1999 |
| EP | 1 187 483 | 3/2002 |
| WO | 9217959 A1 | 10/1992 |

* cited by examiner

| Byte # | Function | Description |
|---|---|---|
| 0-3 | System Control | Control |
| 4-12 | Fixed Keys & Hash Values | Address Pointers |
| 13-23 | TBD | |

Byte #0-3

| Bits | | Action | Function |
|---|---|---|---|
| 0,1 | XX | None | Copy Control |
| | XX | No more copies | |
| | XX | Copy once | |
| | XX | Display only | |
| 2-7 | XXXXXX | Reserved | |
| 8-11 | XXXX | Table # | Designate Table |
| 12-15 | XXXX | Control | Key Rotation |
| 16-31 | X—X | CRC | |

|   | 1 | 2 | 3 | 4 | 5 | 6 | 7 | 8 | 9 | 10 | 11 |
|---|---|---|---|---|---|---|---|---|---|----|----|
| 1 | A | B | C | D | A | B | C | D | A | B  | C  |
| 2 | D | A | B | C | D | A | B | C | D | A  | B  |
| 3 | C | D | A | B | C | D | A | B | C | D  | A  |
| 4 | B | C | D | A | B | C | D | A | B | C  | D  |
| 5 | A | B | C | D | A | B | C | D | A | B  | C  |
| ⋮ | ⋮ |   |   |   |   |   |   |   |   |    |    |
*Figure 15*
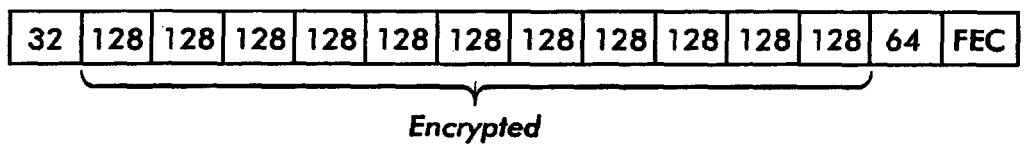
*Figure 16*
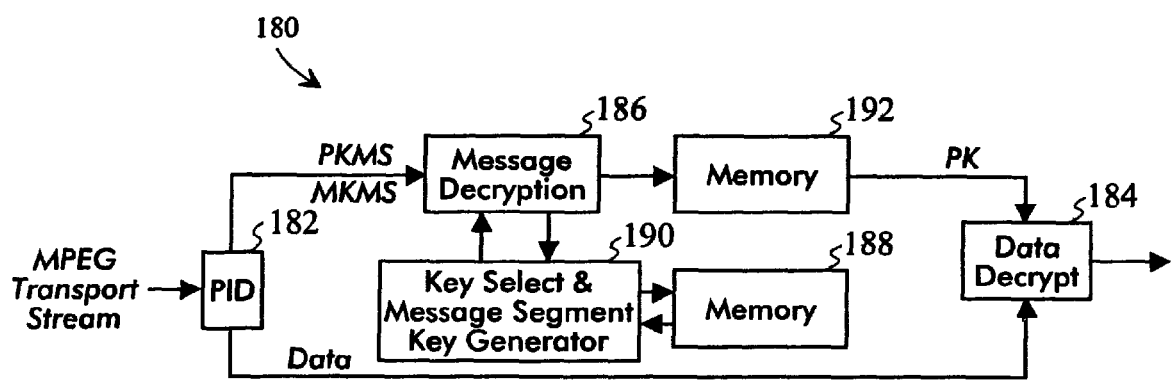
*Figure 17*

OPPORTUNISTIC USE OF KEYS DURING ENCRYPTION/DECRYPTION

RELATED APPLICATIONS

This application is a division of U.S. patent application Ser. No. 11/137,272, filed on May 25, 2005 now U.S. Pat. No. 8,189,786.

TECHNICAL FIELD OF THE INVENTION

The present invention relates to the encryption and decryption of data transmitted between a transmitter and a receiver and, more particularly, to the encryption and decryption of both data and the encryption keys used to encrypt the data.

BACKGROUND OF THE INVENTION

There are many systems in which the unauthorized copying of data has undesired consequences. For example, in pay-per-view systems such as those offered by hotels, motels, and cable systems, the suppliers offering pay-per-view programming lose substantial revenues if their programs are pirated.

Many tools are commonly available at hardware stores, hobby shops, university laboratories, and are provided by hackers and experts to enable the reverse-engineering of all aspects of data transmission systems, including pay-per-view systems. Accordingly, pay-per-view suppliers and others interested in copy protection implement various copy protection systems in order to prevent unauthorized copying.

Copy protection systems have a number of security goals. For example, copy protection systems are intended to prevent the theft of high quality compressed digital content, to prevent theft of high quality uncompressed digital content, and to limit losses caused by break-ins.

The copy protection system of the present invention is intended to thwart unauthorized copying of content.

SUMMARY OF THE INVENTION

According to one aspect of the present invention, a method of decrypting an encrypted program received in an MPEG transport stream comprises receiving a message in the MPEG transport stream, wherein the message contains a key; decrypting the encrypted program based on the key; and, replacing the message in the MPEG transport stream with a null packet.

According to another aspect of the present invention, a method of decrypting an encrypted program received in an MPEG transport stream comprises receiving a first message in the MPEG transport stream, wherein the message contains a first key; replacing the first message in the MPEG transport stream with a first null packet; receiving a second message in the MPEG transport stream, wherein the message includes a second key; replacing the second message in the MPEG transport stream with a second null packet; and, decrypting the encrypted program based on the first and second keys.

BRIEF DESCRIPTION OF THE DRAWINGS

These and other features and advantages will become more apparent from a detailed consideration of the invention when taken in conjunction with the drawings in which:

FIG. 15 illustrates an example rotation for applying the program keys PK during encryption of program data;

FIG. 16 illustrates an example of the portions of a program data segment of a field to which the rotation is applied;

FIG. 17 illustrates a decryption decoder of a copy protection receiver according to one embodiment of the present invention;

DETAILED DESCRIPTION

Figure 1:
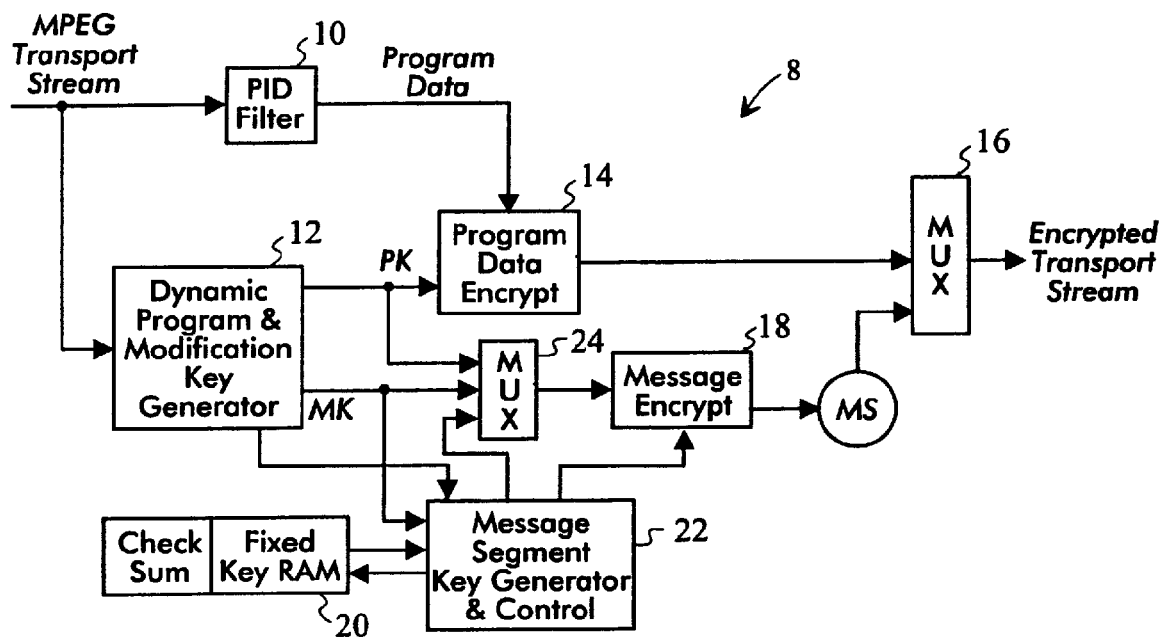
FIG. 1 illustrates an encryption encoder of a copy protection transmitter according to one embodiment of the present invention.

In FIG. 1, an example encryption encoder 8 of a copy protection transmitter includes a PID filter 10 that receives an MPEG transport stream and that determines which packets in the MPEG transport stream contain data to be encrypted. As discussed below, the PID filter 10 also identifies null packets that are to be replaced with message segments MS that give the receiver sufficient information for decrypting the encrypted program data in the received signal, and the PID filter 10 further identifies packets containing information that is not to be encrypted.

A dynamic program key and modification key generator 12 dynamically generates program keys PK that are applied by a first encryption engine 14 in order to encrypt the program data in the MPEG transport stream that has been selected for encryption. The first encryption engine 14, for example, may be a single wrap encryption engine, and may be arranged to apply the single wrap encryption process specified in the Advanced Encryption Standard (AES). The encrypted program data packets are supplied to one input of an output multiplexer 16.

The dynamically generated program keys PK are applied through a multiplexer 24 whereupon they are themselves encrypted by a second encryption engine 18. The second encryption engine 18 may be a triple wrap encryption engine, and may be arranged to apply the triple wrap encryption process specified in the Advanced Encryption Standard.

Unlike the dynamically generated program keys PK that are used by the first encryption engine 14 to encrypt the program data, the keys used by the second encryption engine 18 to encrypt the dynamically generated program keys PK are message segment keys. Fixed keys are stored in a memory 20, these fixed keys are used by a message segment key generator and control 22 to generate message segment keys, and the message segment keys are supplied to the second encryption engine 18.

The fixed keys stored in the memory 20 are, for example, 128 bits long, and there are, for example, sixty-four fixed keys stored in the memory 20. The hash values discussed herein are, for example, sixty-four bits each and are derived as selected portions of the fixed keys. Alternatively, hash values may be separately stored in the memory 20, and the fixed keys and hash values may be of any desired length and number.

Thus, the message segment key generator and control 22 selects the fixed keys to be used by the second encryption engine 18 from the memory 20, uses them to generate message segment keys, and supplies the message segment keys to the second encryption engine 18. The second encryption engine 18 encrypts the dynamically generated program keys PK based on the message segment keys from the message segment key generator and control 22.

As discussed below, a modifier message MM and modification keys MK are also applied through the multiplexer 24 and are encrypted by the second encryption engine 18. The encrypted dynamically generated program keys PK and the encrypted modifier message MM are assembled into program key message segments PKMS that are forwarded to the receiver. As further discussed below, the encrypted modification keys MK, an encrypted checksum, and the encrypted modifier message MM are similarly assembled into modification key message segments MKMS that are also forwarded to the receiver.

The modification keys, which are dynamically generated by the program and modification key generator 12, are used with the fixed keys to generate the message segment keys that are used to encrypt the program keys, and the checksum is based on the fixed keys stored in the memory 20. The checksum, for example, may comprise 128 bits, and may be generated from all of the fixed keys stored in the memory 20. Accordingly, the receiver can compare the checksum from the transmitter with a checksum generated from its own fixed keys to check that its fixed keys match the fixed keys of the transmitter. The checksum could also be used to determine errors in transmission.

As indicated above, the program key message segment PKMS and the modification key message segment MKMS give the receiver the information it requires to decrypt the encrypted program data in the received signal.

Figure 2:
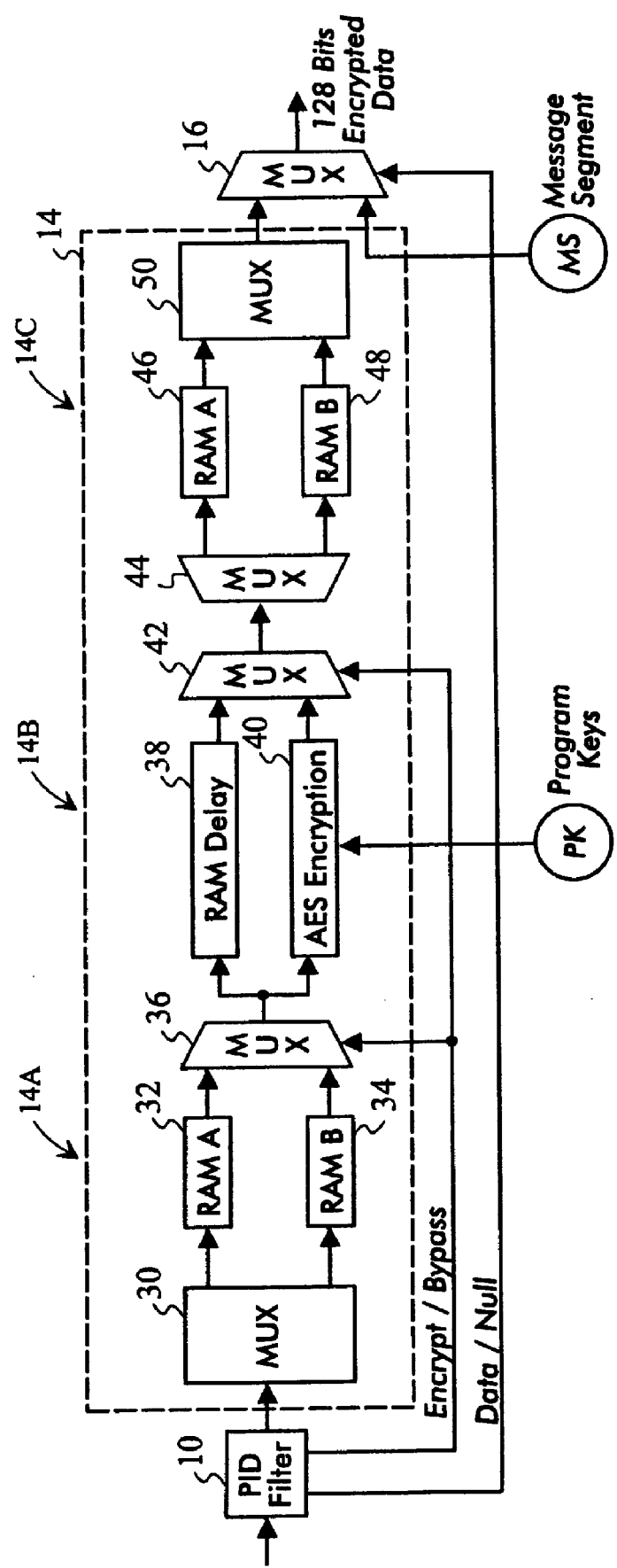
FIG. 2 illustrates the data encryption block of FIG. 1 in greater detail.

FIG. 2 shows the first encryption engine 14 in additional detail. As shown in FIGS. 1 and 2, the first encryption engine 14 is coupled between the PID filter 10 and the output multiplexer 16.

The first encryption engine 14 has three sections 14A, 14B, and 14C. The section 14A includes a de-multiplexer 30, memories 32 and 34, and a multiplexer 36. The section 14B includes a RAM delay 38, an encryption block 40, and a multiplexer 42. The section 14C includes a de-multiplexer 44, memories 46 and 48, and a multiplexer 50.

The PID filter 10 passes transport packets in the MPEG transport stream to the de-multiplexer 30. The transport packets are de-multiplexed and are stored in the memories 32 and 34 that operate in a ping-pong fashion. The transport packets in the memories 32 and 34 are supplied to the multiplexer 36.

The multiplexer 36 passes all packets from the memories 32 and 34 to both the RAM delay 38 and the encryption block 40. These packets include program packets, null packets, and such non-program packets as PIDs, PSIPs, PMTs, and PATs. The encryption block 40 uses the dynamically generated program keys PK to encrypt all packets that it receives and supplies the encrypted packets to the multiplexer 42. In response to an encrypt flag from the PID filter 10, the multiplexer 42 selects only the encrypted packets from the encryption block 40 which correspond to the selected program or programs that are to be encrypted. It will be understood that the MPEG transport stream may contain one or more programs and that any one or more of these programs may be flagged for encryption. All other packets (those that do not correspond to the program to be encrypted) are selected by the multiplexer 42 from the RAM delay 38. Thus, the output of the multiplexer 42 is the input MPEG transport stream except that the packets corresponding to the selected program are encrypted. The multiplexer 42 passes the encrypted and non-encrypted packets to the de-multiplexer 44.

The encrypted and non-encrypted packets from the de-multiplexer 44 are stored in the memories 46 and 48 that operate in a ping-pong fashion. The encrypted and non-encrypted packets in the memories 46 and 48 are supplied through the multiplexer 50 to the output multiplexer 16.

The sections 14A and 14C of the first encryption engine 14 are controlled so as to maintain proper timing, data flow rates, and synchronization.

Figure 3:
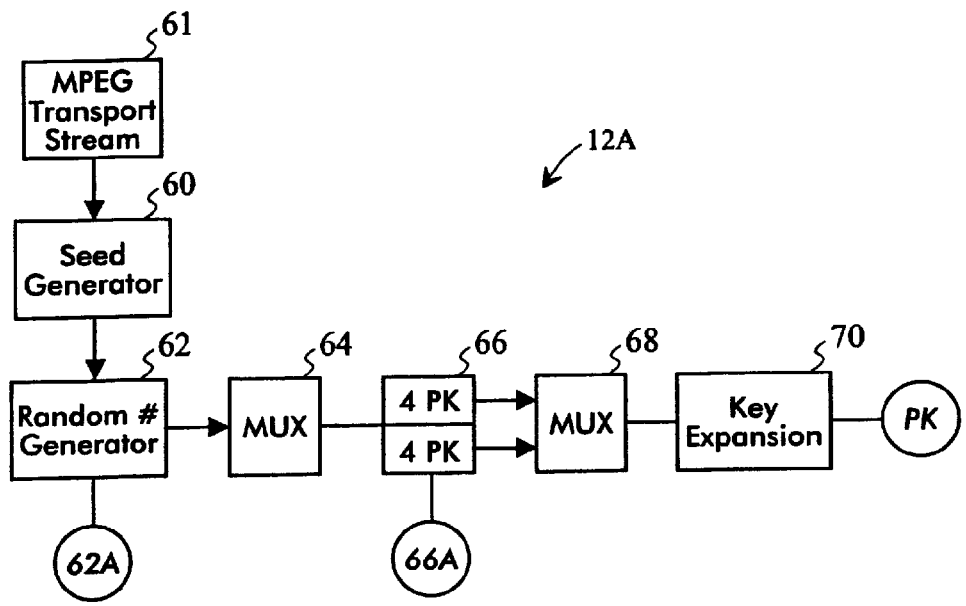
FIG. 3 illustrates the dynamic keys block of FIG. 1 in greater detail.

FIG. 3 shows a dynamic program key generator portion 12A of the dynamic program key and modification key generator 12 in more detail. The dynamic program key generator portion 12A includes a seed generator 60 that supplies a seed to a random number generator 62. For example, the seed generator 60 can select, on any desired basis, the seed from any portion of the MPEG transport stream 61, such as video and/or audio, in one or more program data packets.

A de-multiplexer 64 selects four 128 bit random numbers from the random number generator 62 and stores these four 128 bit random numbers as four dynamically generated program keys in a next portion of a memory 66 while the encryption block 40 uses the four dynamically generated program keys previously stored in an active portion of the memory 66 to encrypt program data. Thus, while the four dynamically generated program keys PK stored in the active portion of the memory 66 are currently being used to encrypt program data, the de-multiplexer 64 selects another four 128 bit random numbers from the random number generator 62 and stores these additional four 128 bit random numbers as four dynamically generated program keys PK in the next portion of the memory 66.

As explained below in connection with FIG. 14, at the time that a modification key message segment MKMS is transmitted, use of the four dynamically generated program keys PK stored in the active portion of the memory 66 is discontinued, and use of the four new dynamically generated program keys PK stored in the next portion of the memory 66 begins. At this transition point, the old next portion of the memory 66 becomes the new active portion of the memory 66, and the old active portion of the memory 66 becomes the new next portion of the memory 66. Also, while these four new dynamically generated program keys PK are being used to encrypt program data, four more program keys PK are dynamically generated and stored in the new next portion of the memory 66.

Figure 4:
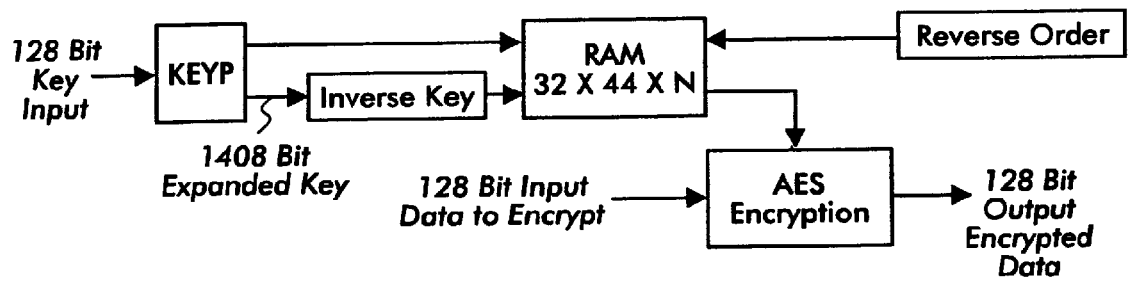
FIG. 4 illustrates the key expansion block of FIG. 3 in greater detail.

A multiplexer 68 supplies the four dynamic program keys from the active portion of the memory 66 to a key expander 70 such as that shown in FIG. 4. As needed, the key expander 70 expands each of the dynamic program keys PK from 128 bit keys to, for example, 1408 bit expanded keys. The expanded dynamic program keys PK are supplied to the encryption block 40 of FIG. 2.

The key expander 70 as shown in FIG. 4 includes an inverse key block. This inverse key block is enabled during program encryption and is disabled during encryption of the program key message segment PKMS and the modification key message segment MKMS.

In this manner, four dynamically generated program keys PK are used to encrypt program data while the next four program keys PK are being dynamically generated. The four dynamically generated program keys PK being used from the active portion of the memory 66 continue to be used until the modification key message segment MKMS is generated.

The time between message segments, for example, can be made dependent upon the availability of null packets in the incoming MPEG transport stream because message segments are transmitted in place of selected null packets. The PID filter 10 detects the null packet and signals output multiplexer 16 to pass a message segment instead of packets from the multiplexer 50.

Figure 5:
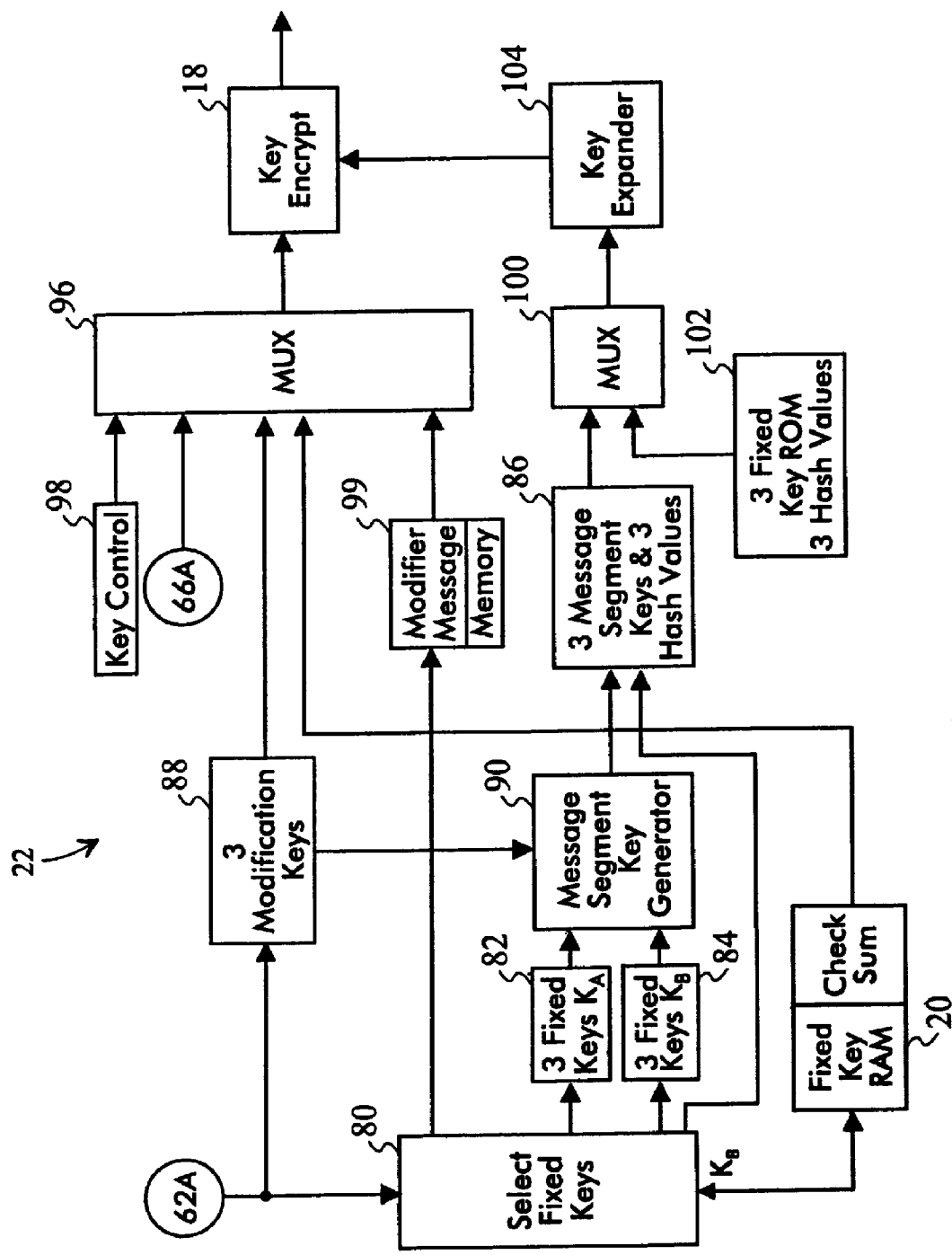
FIG. 5 illustrates portions of FIG. 1 in greater detail.

As shown in FIG. 5, a fixed key selector 80 uses random numbers generated by the random number generator 62 in order to address the memory 20 so as to select fixed keys from the memory 20. For example, each fixed key stored in the memory 20 may be 128 bits, and four 32 bit address words may be used to read each fixed key from the memory 20. These fixed keys are used to encrypt the program keys and modification keys (described in more detail hereinafter) that are sent to the receiver and that are required by the receiver to decrypt the received encrypted program data.

More specifically, three fixed keys are selected from the memory 20 by the fixed key selector 80 and are stored as fixed keys $K_A$ in a fixed key memory 82. Three more fixed keys are selected from the memory 20 by the fixed key selector 80 and are stored as fixed keys $K_B$ in a fixed key memory 84. For example, each of these three fixed keys $K_A$ and three fixed keys $K_B$ may be 128 bits in length. The three fixed keys $K_A$ stored in the fixed key memory 82 and the three fixed keys $K_B$ stored in the fixed key memory 84 are selected on the basis of random addresses from the random number generator 62.

In addition, three Hash values A, B, and C are selected by the fixed key selector 80 and are stored in a message segment key and hash value memory 86. The three Hash values A, B, and C are also selected on the basis of random addresses from the random number generator 62. For example, each of the three Hash values A, B, and C may be 64 bits or ½ of a fixed key. Moreover, three random numbers from the random number generator 62 are stored in a modification key memory 88 as modification keys $K_M$. Each of the modification keys, for example, may be 128 bits in length.

Figures 6, 7:
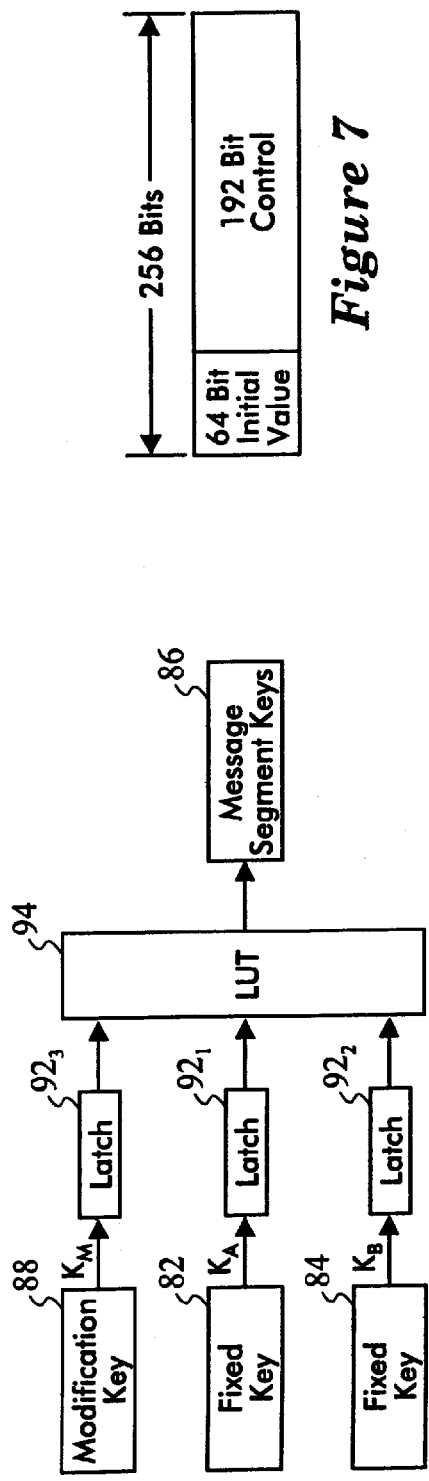
FIG. 6 illustrates the key modifier of FIG. 5 in greater detail.
FIG. 7 illustrates an example modifier message MM used in the copy protection system of FIG. 1.

A message segment key generator 90, which is shown in more detail in FIG. 6, includes latches $92_1$, $92_2$, and $92_3$ and a 96×32 look up table 94. The latch $92_1$ latches the first 32 bits of a first of the three fixed keys $K_A$ stored in the fixed key memory 82, the latch $92_2$ latches the first 32 bits of a first of the three fixed keys $K_B$ stored in the fixed key memory 84, and the latch $92_3$ latches the first 32 bits of a first of the three modification keys $K_M$ stored in the modification key memory 88. These 96 latched bits form a 96 bit address that reads out the first 32 bits of a first message segment key for storage in the message segment key and hash value memory 86.

FIG. 6 also shows, in simplified form, four of the look up tables that are stored in the look up table 94. One of the tables is selected to provide the three message segment keys that are stored in the message segment key and hash value memory 86. The simplified form of table 0 in FIG. 6 shows the relationship between the address and the bits that are stored in table 0. Thus, if the first $K_M$ bit of an address is 0 and the first $K_A$ bit of an address is 0 and the first $K_B$ bit of an address is 0, table 0 will read out a 0 bit for the first bit $K_0$ of a message segment key. However, if the first $K_M$ bit of an address is 1 and the first $K_A$ bit of an address is 1 and the first $K_B$ bit of an address is 0, table 0 will instead read out a 1 bit for the first bit $K_0$ of a message segment key. If the next $K_M$ bit of an address is 0 and the next $K_A$ bit of an address is 0 and the next $K_B$ bit of an address is 0, table 0 will read out a 0 bit for the next bit $K_0$ of the message segment key. However, if the next $K_M$ bit of an address is 0 and the next $K_A$ bit of an address is 1 and the next $K_B$ bit of an address is 0, table 0 will instead read out a 1 bit for the next bit $K_0$ of a message segment key.

The bits that are stored in the tables may have any desired relationship to their addresses. The relationship may be a random, OR, XOR, AND, NAND, NOT, MUX, ones complement, twos complement, or gray scale relationship, and each table may bear a different relationship between the address and the stored bits.

After the first 32 bits of the first message segment key are read out of the look up table 94 and are stored in the message segment key and hash value memory 86, the latch $92_1$ latches the second 32 bits of the first of the three fixed keys $K_A$ stored in the fixed key memory 82, the latch $92_2$ latches the second 32 bits of the first of the three fixed keys $K_B$ stored in the fixed key memory 84, and the latch $92_3$ latches the second 32 bits of the first of the three modification keys $K_M$ stored in the modification key memory 88. These 96 latched bits form a second 96 bit address that reads out the second 32 bits of the first message segment key for storage in the message segment key and hash value memory 86.

The third and fourth 32 bits of the first of the three fixed keys $K_A$ stored in the fixed key memory 82, of the first of the three fixed keys $K_B$ stored in the fixed key memory 84, and of the first of the three modification keys $K_M$ stored in the modification key memory 88 are used to read out the third and fourth 32 bits of the first message segment key from the look up table 94. These third and fourth 32 bits of the first message segment key are also stored in the message segment key and hash value memory 86 to form all 128 bits of the first message segment key. The second and third message segment keys are similarly read out of the look up table 94 and stored in the message segment key and hash value memory 86. These three message segment keys are used to encrypt the program keys. Three other message segment keys are used to encrypt a set of modification keys as explained in more detail below.

As shown in FIG. 5, a multiplexer 96 appropriately multiplexes the four next dynamically generated program keys PK from the memory 66, a key control 98, the modification keys from the modification key memory 88, the checksum from the memory 20, and a modifier message MM from a modifier message memory 99 to create the program key message segment PKMS and the modification key message segment MKMS that are discussed more fully below.

Figures 8, 9, 10:
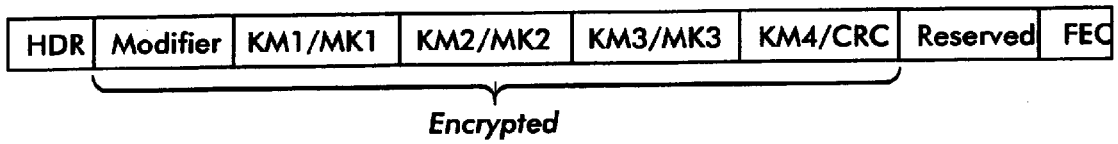
FIG. 8 illustrates a control portion of the modifier message MM illustrated in FIG. 7.
FIG. 9 illustrates an example definition of the system control bytes of the modifier message MM illustrated in FIG. 8.
FIG. 10 illustrates an example message segment MS used in the copy protection system of FIG. 1.

An example of the modifier message MM is shown in FIG. 7. As shown, the modifier message MM contains a 64-bit initial value and a 192 bit control. The use of the initial value is described below. As shown in FIG. 8, the control bits of the modifier message MM comprise, for example, four bytes for system control, nine bytes for address pointers that point to memory addresses for the fixed keys and Hash values, and eleven bytes that can be used for any purpose.

The address pointers discussed above point to the addresses in the memory 20 corresponding to (i) the six fixed keys that are stored in the fixed key memories 82 and 84 and that, in selected combinations, are used by the message segment key generator 90 to generate the message segment keys A, B, and C stored in the message segment key and hash value memory 86 and (ii) the hash values A, B, and C that are also stored in the message segment key and hash value memory 86. These address pointers are sent in the modifier message MM to the receiver so that the receiver can re-generate the message segment keys A, B, and C and corresponding hash values A, B, and C that are required to decrypt the program keys and modification keys, as explained below.

The 32 bits of the system control of the modifier message MM are shown by way of example in FIG. 9. Bits 0 and 1 are used to designate the copy control assigned to the program data. Bits 2-7 are reserved except that at least one of these reserved bits is set to one value to indicate that the corresponding message segment is a modification key message segment MKMS and is set to another value to indicate that the corresponding message segment is a program key message segment PKMS.

When this at least one reserved bit is set to the value that indicates that the corresponding message segment is a modification key message segment MKMS, the bits $K_M$ provided to the look up table 94 are set to a predetermined value such as all zeros while the three message segment keys are being produced for storage in the message segment key and hash value memory 86. In effect, the message segment keys that are used to encrypt the modification key message segment MKMS are produced with modification keys having a predetermined value known to both the transmitter and the receiver.

When the modification keys have this predetermined value, the look up table 94 may pass only the fixed keys $K_A$ as the message segment keys. Alternatively, when the modification keys have this predetermined value, the look up table 94 could instead pass only the fixed keys $K_B$ as the message segment keys, or the look up table 94 could read out message segment keys on the basis of both the fixed keys $K_A$ and $K_E$ from the fixed key memories 82 and 84. These alternatives are based on which of the tables in look up table 94 is selected as indicated by bits 8-11 of the system control of the modifier message MM as discussed below. The message segment keys produced with these modification keys having the predetermined value are used to encrypt the modification key messages MK1, MK2, and MK3 and the checksum message CRC.

When this at least one reserved bit is set to the value that indicates that the corresponding message segment is a program key message segment PKMS, the bits $K_M$ provided to the look up table 94 are the randomly generated modification keys stored in the modification key memory 88, and these randomly generated modification keys are used along with the fixed keys $K_A$ and $K_B$ to produce the three message segment keys stored in the message segment key and hash value memory 86. Thus, the message segment keys that are used to encrypt the program key message segment PKMS are produced with the randomly generated modification keys stored in the modification key memory 88 in addition to the fixed keys $K_A$ and $K_B$ from the fixed key memories 82 and 84. The message segment keys produced with the randomly generated modification keys stored in the modification key memory 88 are used to encrypt the program key messages PK1, PK2, PK3, and PK4.

The fixed keys used to generate the message segment keys that encrypt the program key message segment PKMS may be the same as or different from the fixed keys used to generate the message segment keys that encrypt the modification key message segment MKMS.

Bits 8, 9, 10, and 11 designate which one of the sixteen possible tables stored in the look up table 94 is used to produce the message segment keys stored in the message segment key and hash value memory 86.

Bits 12-15 may be used for any purpose such as indicating to the receiver a particular program key rotation, as discussed below.

Bits 16-31 are a checksum produced by a CRC generator of the modifier message memory 99. Specifically, the CRC generator of the modifier message memory 99 applies a CRC code to bits 0-15 of the system control byte shown in FIG. 9 in order to generate a checksum. This checksum comprises bits 16-31 as shown in FIG. 9. The CRC generator appends this checksum to the unmodified bits 0-15 to form the full system control of the modifier message MM. This full system control of the modifier message MM is used by the receiver to determine if the program key message segment PKMS and/or the modification key message segment MKMS is not properly received due, for example, to noise in the channel and is described in more detail below.

As shown in FIG. 5, a multiplexer 100 receives the message segment keys and hash values stored in the message segment key and hash value memory 86. The multiplexer 100 also receives three fixed keys A', B', and C' and three Hash values A', B', and C' stored in a memory 102. For example, the three fixed keys A', B', and C' stored in the memory 102 each comprises a 128 bit fixed key, and the three Hash values A', B', and C' stored in the memory 102 each comprises a 64 bit Hash value.

The multiplexers 96 and 100 operate in conjunction with the second encryption engine 18 to encrypt the encrypted portion of the message segments MS shown in FIG. 10. In the case of the program key message segment PKMS, the encrypted portion of the message segment MS shown in FIG. 10 includes the modifier message MM, and four program key messages KM1, KM2, KM3, and KM4. In the case of the modification key message segment MKMS, the encrypted portion of the message segment MS shown in FIG. 10 includes the modifier message MM, the three modification key messages MK1, MK2, and MK3, and the fixed key checksum CRC. The modifier messages MM include the initial value and the 192 bit control as shown in FIGS. 7 and 8. The initial value, for example, may include 64 predetermined arbitrary bits.

In order to encrypt the modifier message MM, the multiplexer 100 passes the three fixed keys A', B', and C' and the three Hash values A', B', and C' from the memory 102 through a key expander 104 to the second encryption engine 18. The key expander 104, for example, may be similar to the key expander 70 and expands only the fixed keys A', B', and C'. The key expander 104 does not expand the Hash values A', B', and C'. Also, the multiplexer 96 passes the modifier message MM to the second encryption engine 18.

Figure 11:
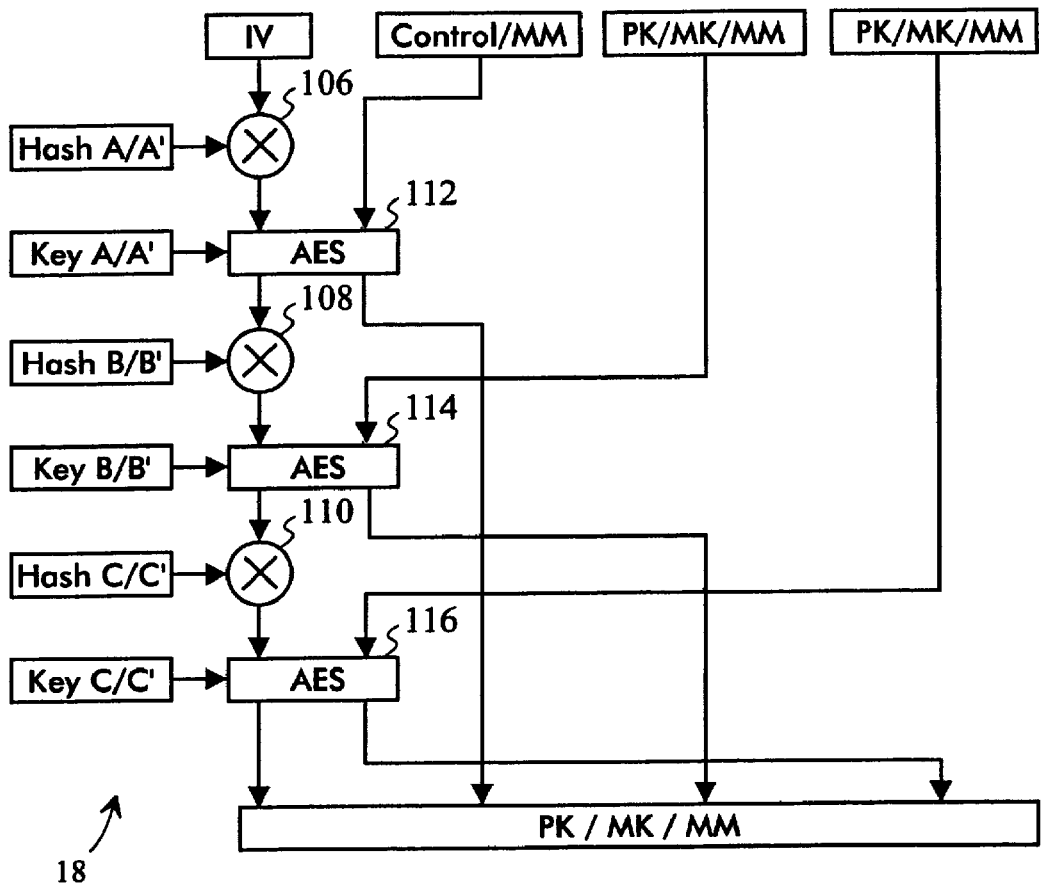
FIG. 11 illustrates the program key, modification keys and modifier message MM encryption block of FIG. 1 in greater detail.

The second encryption engine 18 is shown in more detail in FIG. 11. The Hash value A' is applied to an EXCLUSIVE OR 106, the Hash value B' is applied to an EXCLUSIVE OR 108, and the Hash value C' is applied to an EXCLUSIVE OR 110. The EXCLUSIVE ORs 106, 108, and 110 bit-wise process their respective inputs. The expanded fixed key A' is applied to an AES encrypter 112, the expanded fixed key B' is applied to an AES encrypter 114, and the expanded fixed key C' is applied to an AES encrypter 116.

The initial value of the modifier message MM is applied to the EXCLUSIVE OR 106, a first ⅓ of the control bits of the modifier message MM is applied to the AES encrypter 112, a second ⅓ of the control bits of the modifier message MM is applied to the AES encrypter 114, and a third ⅓ of the control bits of the modifier message MM is applied to the AES encrypter 116.

The AES encrypter 112 encrypts an output of the EXCLUSIVE OR 106 and the first ⅓ of the control bits of the modifier message MM according to the expanded fixed key A', and supplies half of the encryption result to the EXCLUSIVE OR 108 and the other half as the second ¼ of the encrypted modifier message MM. The AES encrypter 114 encrypts an output of the EXCLUSIVE OR 108 and the second ⅓ of the control bits of the modifier message MM according to the expanded fixed key B', and supplies half of the encryption result to the EXCLUSIVE OR 110 and the other half as the third ¼ of the encrypted modifier message MM. The AES encrypter 116 encrypts an output of the EXCLUSIVE OR 110 and the third ⅓ of the control bits of the modifier message MM according to the expanded fixed key C', and supplies half of the encryption result as the first ¼ of the encrypted modifier message MM and the other half as the fourth ¼ of the encrypted modifier message MM.

Figure 12:
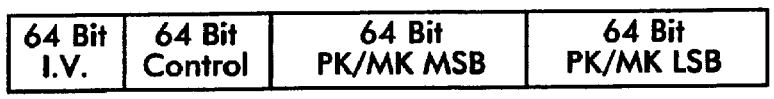
FIG. 12 illustrates an example key message that is part of the message segment MS illustrated in FIG. 10.

Each key message in the program key message segment PKMS has the example construction of FIG. 12. According to this example, a program key message KM1 includes a 64-bit initial value, which may be same initial value as discussed above or a different initial value, a 64-bit key control 98, and one of the 128-bit program keys divided into two 64-bit portions. The program key messages KM2, KM3, and KM4 containing the other three program keys are similarly constructed.

The key control 98 is used to designate whether the key message contains a program key, a modification key, or the checksum.

In order to encrypt the program key message KM1, the multiplexer 100 passes the three message segment keys A, B, and C and the three Hash values A, B, and C from the message segment key and hash value memory 86 through the key expander 104 to the second encryption engine 18. As explained above, the three message segment keys A, B, and C that are used to encrypt the program key messages are the message segment keys read out of the table 94 by use of the randomly generated modification keys $K_M$ stored in the modification key memory 88, the fixed keys $K_A$ from the fixed key memory 82, and the fixed keys $K_B$ from the fixed key memory 84. The key expander 104 expands only the message segment keys A, B, and C. The key expander 104 does not expand the Hash values A, B, and C. Also, the multiplexer 96 passes the first of the four dynamically generated program keys from the next portion of the memory 66 to the second encryption engine 18.

In the second encryption engine 18, the Hash value A is applied to the EXCLUSIVE OR 106, the Hash value B is applied to the EXCLUSIVE OR 108, and the Hash value C is applied to the EXCLUSIVE OR 110. The expanded message segment key A is applied to the AES encrypter 112, the expanded message segment key B is applied to the AES encrypter 114, and the expanded message segment key C is applied to the AES encrypter 116. The initial value is applied to the EXCLUSIVE OR 106, the control word is applied to the AES encrypter 112, a first ½ of the first of the four dynamically generated program keys is applied to the AES encrypter 114, and a second half of the first of the four dynamically generated program keys is applied to the AES encrypter 116.

The AES encrypter 112 encrypts an output of the EXCLUSIVE OR 106 and the control word according to the expanded message segment key A, and supplies half of the encryption result to the EXCLUSIVE OR 108 and the other half as the second ¼ of the program key message KM1. The AES encrypter 114 encrypts an output of the EXCLUSIVE OR 108 and the first ½ of the first of the four dynamically generated program keys according to the expanded message segment key B, and supplies half of the encryption result to the EXCLUSIVE OR 110 and the other half as the third ¼ of the program key message KM1. The AES encrypter 116 encrypts an output of the EXCLUSIVE OR 110 and the second ½ of the first of the four dynamically generated program keys according to the expanded message segment key C, and supplies half of the encryption result as the first ¼ of the program key message KM1 and the other half as the fourth ¼ of the program key message KM1.

The other three program key messages KM2, KM3, and KM4 are similarly generated.

Each modification key message in the modification key message segment MKMS also has the example construction of FIG. 12. According to this example, a modification key message MK1 includes a 64-bit initial value, which may be same initial value as discussed above or a different initial value, a 64-bit key control 98, and one of the 128-bit modification keys divided into two 64-bit portions. The modification key messages MK2 and MK3 containing the other two modification keys are similarly constructed.

Again, the key control 98 is used to designate whether the key message contains a program key, a modification key, or the checksum.

In order to encrypt the modification key message MK1, the multiplexer 100 passes the three message segment keys A, B, and C and the three Hash values A, B, and C from the message segment key and hash value memory 86 through the key expander 104 to the second encryption engine 18. As explained above, the three message segment keys A, B, and C that are used to encrypt the modification key messages are the message segment keys read out of the table 94 by use of the modification keys with the predetermined value. Thus, the fixed keys $K_A$ from the fixed key memory 82 may be read out of the table 94 as the message segment keys. Alternatively, as explained above, the fixed keys $K_B$ from the fixed key memory 84 can be read out of the table 94 as the message segments keys or a combination of the fixed keys $K_A$ and $K_B$ can be used to read out the message segment keys from the table 94. The key expander 104 expands only the message segment keys A, B, and C. The key expander 104 does not expand the Hash values A, B, and C. Also, the multiplexer 96 passes the first of the modification keys from the modification key memory 88 to the second encryption engine 18.

The Hash values A, B, and C are applied to the EXCLUSIVE ORs 106, 108, and 110 as before. Also, the expanded message segment keys A, B, and C are applied to the AES encrypters 112, 114, and 116 as before. The initial value is applied to the EXCLUSIVE OR 106, the control word is applied to the AES encrypter 112, a first ½ of the first of the three modification keys is applied to the AES encrypter 114, and a second half of the first of the three modification keys is applied to the AES encrypter 116.

The AES encrypter 112 supplies half of its encryption result to the EXCLUSIVE OR 108 and the other half as the second ¼ of the modification key message MK1. The AES encrypter 114 supplies half of its encryption result to the EXCLUSIVE OR 110 and the other half as the third ¼ of the modification key message MK1. The AES encrypter 116 supplies half of its encryption result as the first ¼ of the modification key message MK1 and the other half as the fourth ¼ of the modification key message MK1.

The other two modification key messages MK2 and MK3 and the checksum message CRC are similarly generated.

The output multiplexer 16 of FIG. 1 muxes the encrypted program data, the MPEG PID header from the transport stream, 192 clock bits which may be supplied by a separate generator and which may be the SMPTE time code (if any), and 20 forward error correction bytes from the transport stream with the encrypted program key message segment PKMS and the encrypted modification key message segment MKMS to form the encrypted transport stream. Each of the program key message segment PKMS and the modification key message segment MKMS is contained in a corresponding complete ATSC data segment.

Figure 13:
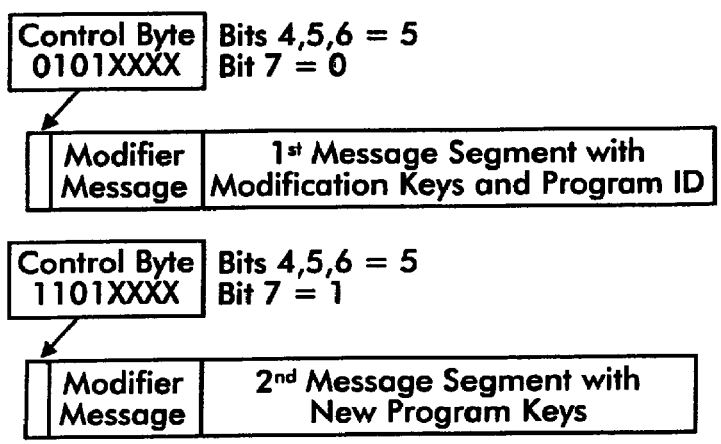
FIG. 13 illustrates an example pair of message segments MS used to transmit program keys and modification keys.

The second encryption engine 18 generates the message segments MS in pairs, i.e., the program key message segment PKMS and the modification key message segment MKMS. This pair of message segments MS is shown in FIG. 13. The modifier message MM in each message segment MS is provided in accordance with FIGS. 8 and 9. The first message segment shown in FIG. 13 is the modification key message segment MKMS and contains an encrypted form of the three modification keys stored in the modification key memory 88 and the checksum (CRC) from the memory 20. The second message segment shown in FIG. 13 is the program key message segment PKMS and contains an encrypted form of the four encrypted new program keys to be applied by the receiver to decrypt the encrypted program data.

Thus, as shown in FIG. 10, the modifier message MM and the four program key messages KM1, KM2, KM3, and KM4 of the program key message segment PKMS are encrypted. Similarly, the modifier message MM, the three modification key messages MK1, MK2, and MK3, and the checksum message CRC of the modification key message segment MKMS are encrypted.

The four byte header of the message segment MS shown in FIG. 10 is the MPEG PID. The modifier message MM includes the message control bytes shown in FIG. 9. This control byte identifies the message segment MS in a pair either as the program key message segment PKMS or as the modification key message segment MKMS, as explained above.

Figure 14:
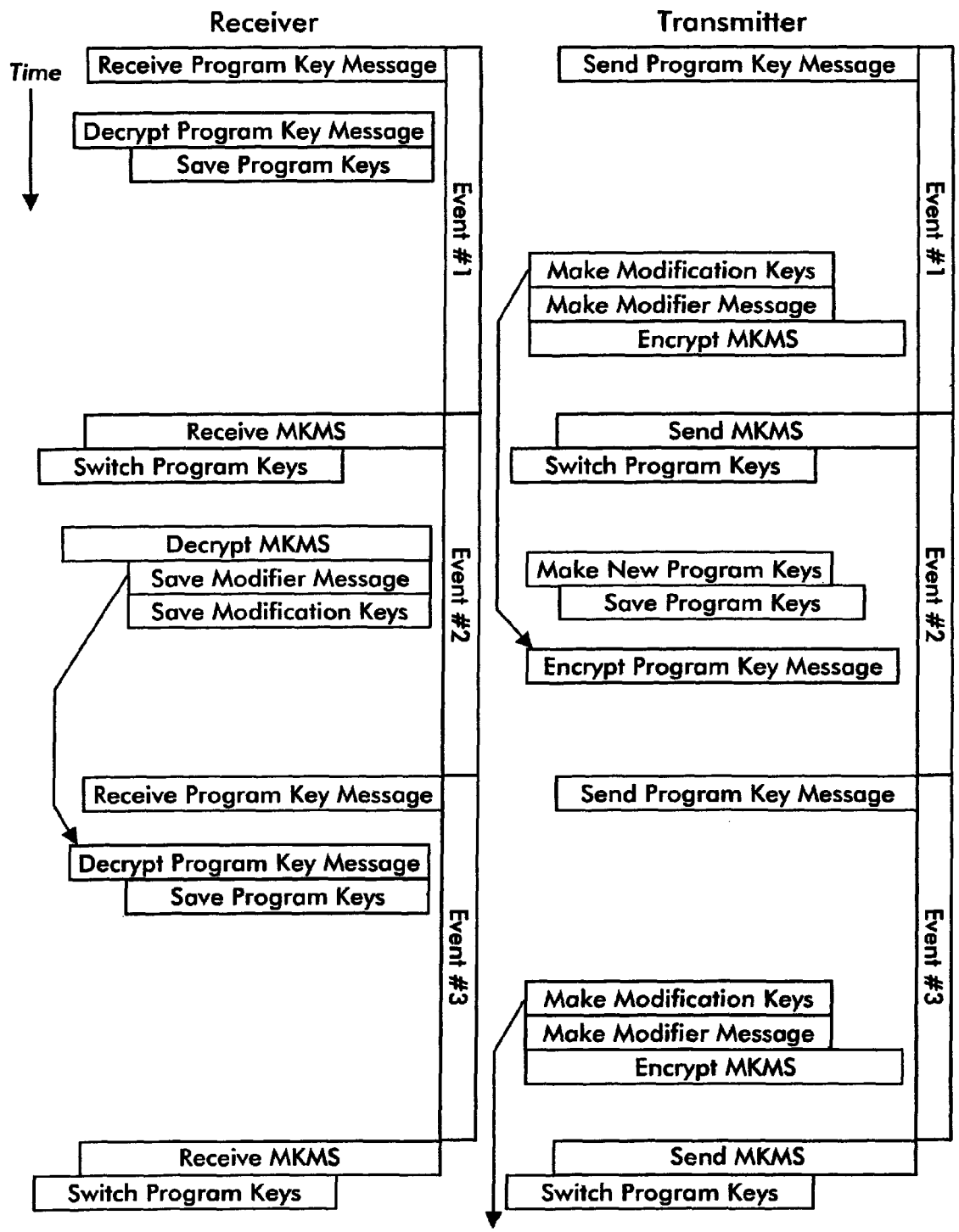
FIG. 14 illustrates the timing of the transmitter and receiver with respect to message generation and use.

FIG. 14 shows the relative message pair transmission and reception timing upon which key synchronization is determined. Upon the occurrence of event 1, which may be a null packet in the MPEG transport stream, a program key message segment PKMS as shown in FIG. 14 is transmitted. The receiver receives this program key message segment PKMS, decrypts it, and stores the program keys that were contained in the program key message segment PKMS as next program keys. However, the receiver does not start using these next program keys yet.

After the transmitter transmits the program key message segment PKMS, the encryption encoder 8 of the transmitter makes the three modification keys and the modifier message MM, and encrypts the modifier message MM and the three modification keys using the message segment keys and the Hash values as described above. The encryption encoder 8 then assembles the modification key message segment MKMS containing the encrypted modifier message MM and the three modification keys as described above. When a null packet is detected (event 2), the transmitter transmits the modification key message segment MKMS in place of the null packet and, at the same time, the encryption encoder 8 begins using the next program keys stored in the memory 66 as the active program keys to encrypt program data. Thus, the next program keys become the active program keys.

At the same time, the receiver receives this modification key message segment MKMS and immediately begins using its previously stored next program keys as the active program keys to decrypt program content. Accordingly, the replacement of the active program keys with the next program keys is made at the same time in the transmitter and receiver so that the transmitter and receiver use the same program keys to encrypt and decrypt the same program content.

After the transmitter transits the modification key message segment MKMS and switches program keys, the encryption encoder 8 of the transmitter makes new program keys, and saves the new program keys in the memory 66 as the next program keys. The encryption encoder 8 encrypts the new program keys and assembles another program key message segment PKMS containing the new program keys and waits for an opportunity (event 3 such as a null packet) to transmit this program key message segment PKMS.

While the encryption encoder 8 of the transmitter makes new program keys, saves the new program keys, and assembles the next program key message segment PKMS, the receiver decrypts the modification key message segment MKMS that it has just received, and saves the modifier message MM and the modification keys contained in this message.

During segments in which the encryption encoder 8 is not transmitting program key message segments PKMS and modification key message segments MKMS, the encryption encoder 8 is using the active program keys to encrypt program data and is transmitting the encrypted program data to the receiver.

During segments in which the receiver is not receiving program key message segments PKMS and modification key message segments MKMS, the receiver is using the active program keys to decrypt program data.

In an embodiment where message transmission and key use is synchronized to the occurrence of null packets, there may be occasions when null packets are occurring with an undesirably high frequency. For example, during periods where there is little action in the video, many null packets can occur during a single frame. Therefore, it may be desirable to add a delay function such that message transmission and key switching does not occur more often than a predetermined frequency. For example, this delay function may be set so that message transmission and key switching does not occur more often than once per two or three ATSC frames.

During encryption of program data, the encryption block 40 rotates the four active program keys PK. FIG. 15 shows the rotation. As shown in FIG. 16, each program data segment of a field to be transmitted to the receiver includes a non-encrypted four byte MPEG header that identifies the segment as a program data segment, eleven blocks each containing encrypted 128 bits of program data, eight bytes of non-encrypted program data, and twenty bytes of non-encrypted forward error correction data.

As shown in FIG. 15, the four active program keys A, B, C, and D are applied in the following order to the eleven blocks of data in the first program data segment: A, B, C, D, A, B, C, D, A, B, C. Accordingly, the active program key A is applied to the first of the eleven blocks of data to be encrypted, the active program key B is applied to the second of the eleven blocks of data to be encrypted, . . . , and the active program key C is applied to the eleventh of the eleven blocks of data to be encrypted.

This same rotation scheme ABCDABCDABC can be used for the next and subsequent program data segments of a field.

Alternatively, the next program data segment can continue the rotation. Thus, the active program keys A, B, C, and D are applied in the following order to the eleven blocks of data to be encrypted in the second program data segment: D, A, B, C, D, A, B, C, D, A, B. Accordingly, the active program key D is applied to the first of the eleven blocks of data to be encrypted, the active program key A is applied to the second of the eleven blocks of data to be encrypted, . . . , and the active program key B is applied to the eleventh of the eleven blocks of data to be encrypted. The rotation can then be continued for subsequent program data segments as indicated by FIG. 15.

As a further alternative, other rotation sequences can be used. Bits 12-15 of the system control byte shown in FIG. 9 can be used to indicate to the receiver the particular rotation being used in the transmitter.

The output multiplexer 16 transmits encrypted program data segments continuously until an opportunity (event) arises for transmitting a message segment MS (either a program key message segment PKMS or a modification key message segment MKMS). The occurrence of a null packet gives rise to the opportunity for transmitting one of these message segments, the occurrence of the next null packet gives rise to the opportunity for transmitting the other of the message segments MS in the pair, and so on. An objective may be established for transmitting a message segment MS on a periodic basis dependent upon the occurrence of a null packet. For example, the objective may be to transmit a message segment MS no more often than once per field of 312 segments.

An example decryption decoder 180 of a copy protection receiver is shown in FIG. 17. The decryption decoder 180 includes a PID filter 182 that, based on PID numbers, detects and forwards encrypted program data to a first decryption engine 184 and detects and forwards program key message segments PKMS and modification key message segments MKMS to a second decryption engine 186. The first decryption engine 184 performs a single wrap decryption process which is complementary to the single wrap encryption process performed by the first encryption engine 14.

When the modification key message segment MKMS is received, the second decryption engine 186 decrypts (unwraps) this message segment in order to recover the modification keys and the fixed key and hash value addresses of a memory 188. A fixed key selector and message segment key generator 190 uses these fixed key and hash value addresses to retrieve fixed keys and hash values from the memory 188. In the case of decrypting the modification key message segment MKMS, the fixed key selector and message segment key generator 190 uses the fixed keys and hash values retrieved from the memory 188 along with the a prior known modification keys, i.e., the modification keys having the known predetermined value, in order to regenerate the message segment keys that were used in the encryption encoder 8 to encrypt the modification keys and the checksum message CRC and that are required by the decryption decoder 180 to decrypt the encrypted modification keys and the checksum message CRC. In the case of decrypting the program key message segment PKMS, the fixed key selector and message segment key generator 190 uses the fixed keys and hash values retrieved from the memory 188 based on the memory addresses contained in the modifier message of the program key message segment PKMS along with the decrypted modification keys in order to regenerate the message segment keys that were used in the encryption encoder 8 to encrypt the program keys and that are required by the decryption decoder 180 to decrypt the encrypted program key messages KM1, KM2, KM3, and KM4.

When the program key message segment PKMS is received, the second decryption engine 186 decrypts program keys in the message segment MS using the message segment keys from the fixed key selector and message segment key generator 190 and stores the decrypted program keys in the next portion of a memory 192. In the meantime, the first decryption engine 184 uses the active program keys stored in the memory 192 to decrypt the encrypted data from the program data segments of the field being received.

Figure 18:
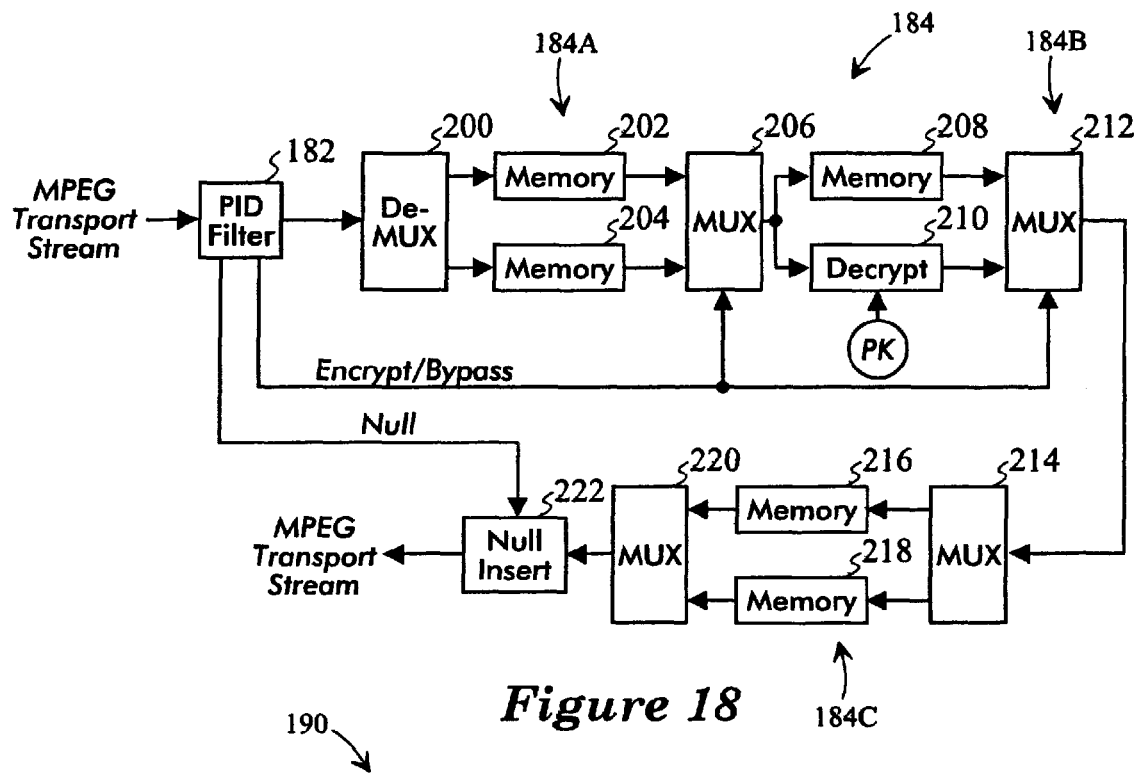
FIG. 18 illustrates the data decryption block of FIG. 17 in greater detail.

As shown in FIG. 18, the first decryption engine 184 includes three sections 184A, 184B, and 184C. The section 184A includes a de-multiplexer 200, memories 202 and 204, and a multiplexer 206. The section 184B includes a memory 208, a decryption block 210, and a multiplexer 212. The section 184C includes a de-multiplexer 214, memories 216 and 218, and a multiplexer 220. The sections 184A, 184B, and 184C are controlled by the PID filter 182.

The PID filter 182 passes all packets in the MPEG transport stream to the de-multiplexer 200. All packets are de-multiplexed and are stored in the memories 202 and 204 that operate in a ping-pong fashion. All packets in the memories 202 and 204 are supplied to the multiplexer 206.

The multiplexer 206 passes all packets from the memories 202 and 204 to the memory 208 and to the decryption block 210. These packets include program packets (one or more of which may be encrypted), message segments, and such non-program packets as PIDs, PSIPs, PMTs, and PATs. The decryption block 210 uses the decrypted program keys PK to decrypt all packets that it receives and supplies the decrypted packets to the multiplexer 212. The multiplexer 212, in response to a decryption flag from the PID filter 182, selects only the decrypted packets from the decryption block 210 which correspond to the selected program or programs that were to be decrypted. All other packets (those that do not correspond to the program to be decrypted) are selected by the multiplexer 212 from the memory 208. Thus, the output of the multiplexer 212 is the original MPEG transport stream less null packets and including message segments. The multiplexer 212 passes the decrypted and non-encrypted packets to the de-multiplexer 214.

The decrypted and non-encrypted packets from the de-multiplexer 214 are stored in the memories 216 and 218 that operate in a ping-pong fashion. The decrypted and non-encrypted packets in the memories 216 and 218 are supplied through the multiplexer 220 to a null inserter 222.

The null inserter 222 is controlled by the PID filter 182 to remove the program key message segments PKMS and the modification key message segments MKMS from the transport stream, and to insert null packets back into the transport stream in place of the removed program key message segments PKMS and the removed modification key message segments MKMS. The output of the null inserter is the decrypted MPEG transport stream.

The sections 184A and 184C of the first decryption engine 184 are controlled by the message packets so as to maintain proper timing, data flow rates, and synchronization.

Figure 19:
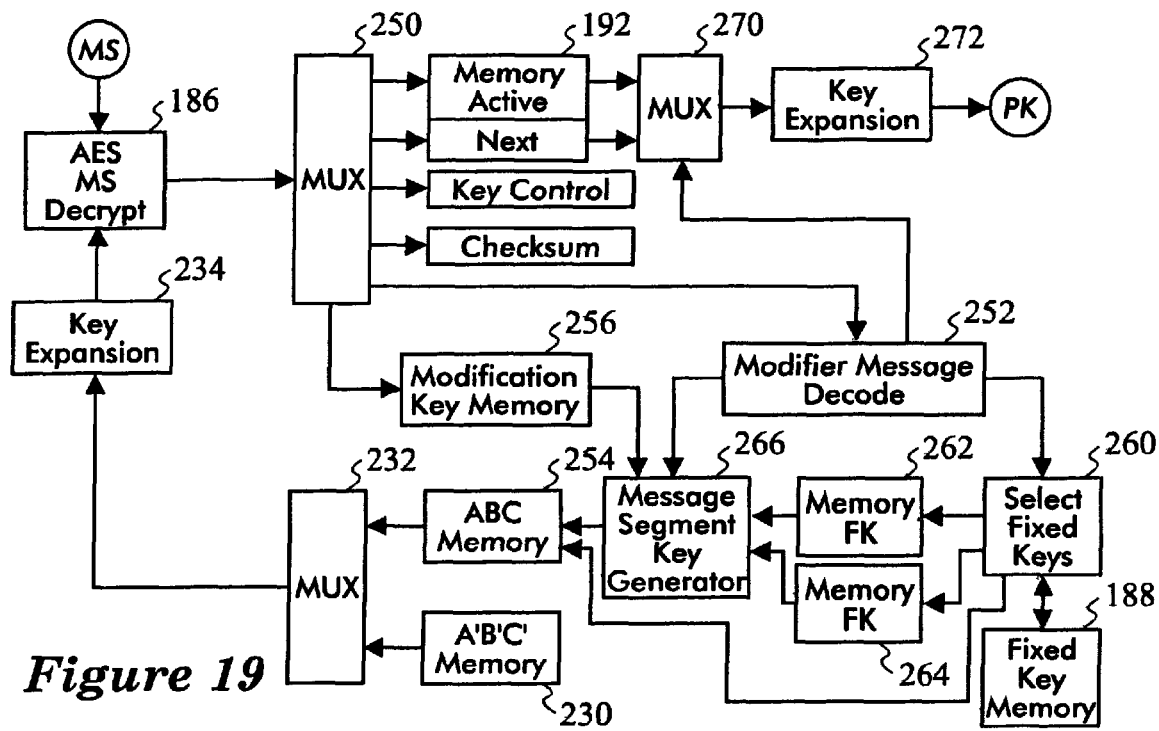
FIG. 19 illustrates portions of the decryption decoder of FIG. 17 in greater detail; and, FIG. 20 illustrates the key and modifier message decryption block of FIG. 17 in greater detail.
Figure 20:
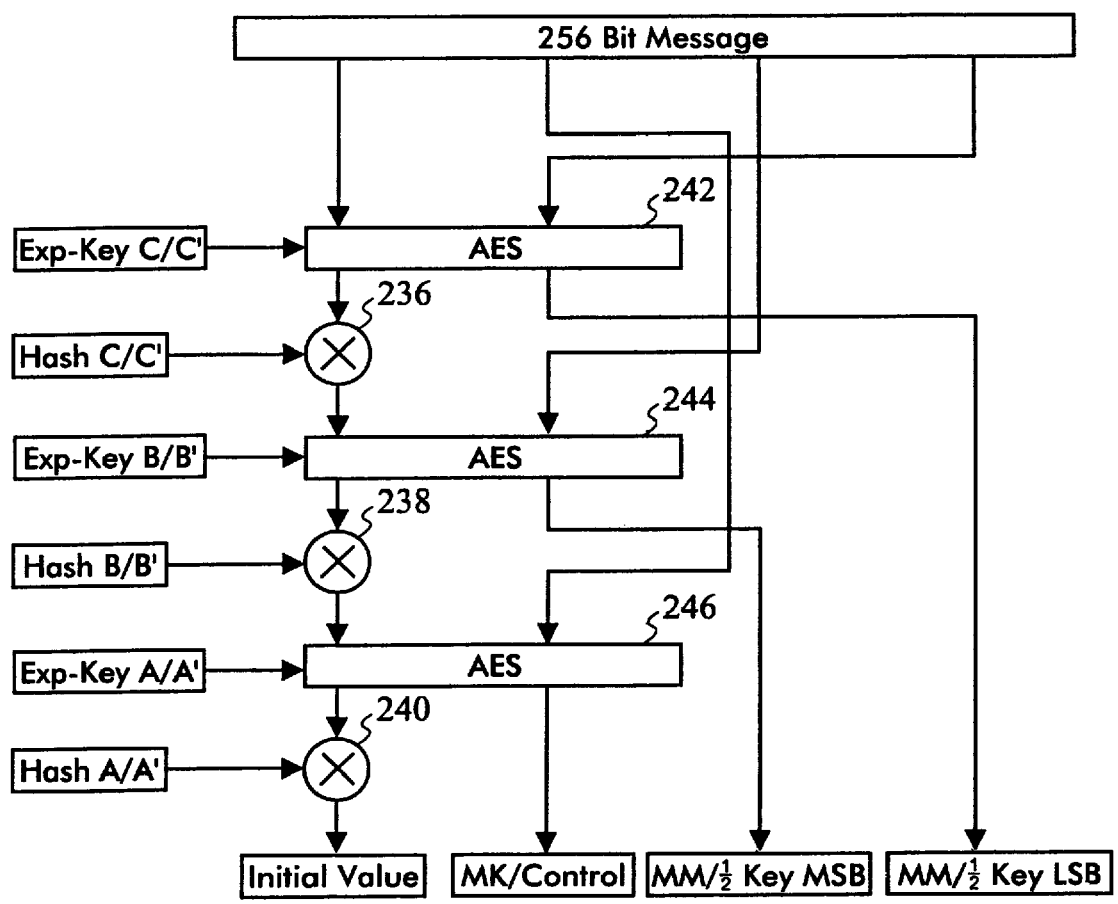

The fixed key selector and message segment key generator 190 is shown in more detail in FIG. 19. As shown in FIG. 19, the program key message segments PKMS and the modification key message segments MKMS are supplied to the second decryption engine 186. Each of these message segments has the form shown in FIG. 10. Accordingly, as shown in FIG. 20, the modifier message MM in the received message segment is decrypted using the three fixed keys A', B', and C' and the three Hash values A', B', and C' which are stored in a memory 230. The three fixed keys A', B', and C' and the three Hash values A', B', and C' stored in memory 230 are the same fixed keys and Hash values that are stored in the memory 102.

The decrypted modifier message MM indicates to the receiver, inter alia, whether the corresponding message segment is a program key message segment PKMS or a modification key message segment MKMS. If the corresponding message segment is a program key message segment PKMS, the receiver knows to use the decrypted modification keys $K_M$ as well as the fixed keys $K_A$ and $K_B$ to produce that the message segment keys that are required for decryption of the program key messages. If the corresponding message segment is a modification key message segment MKMS, the receiver knows to use the known modification keys having the predetermined value in order to read out the fixed keys $K_A$, $K_B$, or some combination of $K_A$ and $K_B$ as the message segment keys that are required for decryption of the modification key messages and the checksum message CRC.

In order to decrypt the modifier message MM in a received one of the modification key message segments MKMS or the program key message segments PKMS, a multiplexer 232 passes the three fixed keys A', B', and C' and the three Hash values A', B', and C' from the memory 230 through a key expander 234 to the second encryption engine 186. The key expander 234, for example, may be similar to the key expander 104 and expands only the fixed keys A', B', and C'. The key expander 234 does not expand the Hash values A', B', and C'.

The second encryption engine 186 which performs an operation complementary to that performed by the encryption engine 18 is shown in more detail in FIG. 20. As shown in FIG. 20, the Hash value C' is applied to an EXCLUSIVE OR 236, the Hash value B' is applied to an EXCLUSIVE OR 238, and the Hash value A' is applied to an EXCLUSIVE OR 240. The EXCLUSIVE ORs 236, 238, and 240 bit-wise process their respective inputs. The expanded fixed key C' is applied to an AES decrypter 242, the expanded fixed key B' is applied to an AES decrypter 244, and the expanded fixed key A' is applied to an AES decrypter 246.

The first ¼ of the encrypted modifier message MM is applied to the AES decrypter 242, the second ¼ of the encrypted modifier message MM is applied to the AES decrypter 246, the third ¼ of the encrypted modifier message MM is applied to the AES decrypter 244, and the fourth ¼ of the encrypted modifier message MM is applied to the AES decrypter 242.

The AES decrypter 242 decrypts the first ¼ and the fourth ¼ of the encrypted modifier message MM according to the expanded fixed key C', and supplies half of the decryption result to the EXCLUSIVE OR 236 and the other half as the third ⅓ of the control bits of the decrypted modifier message MM. The AES decrypter 244 decrypts an output of the EXCLUSIVE OR 236 and the third ¼ of the encrypted modifier message MM according to the expanded fixed key B', and supplies half of the decryption result to the EXCLUSIVE OR 238 and the other half as the second ⅓ of the control bits of the decrypted modifier message MM. The AES encrypter 246 decrypts an output of the EXCLUSIVE OR 238 and the second ¼ of the encrypted modifier message MM according to the expanded fixed key A', and supplies half of the encryption result to the EXCLUSIVE OR 240 and the other half as the first ⅓ of the decrypted modifier message MM. The output of the EXCLUSIVE OR 240 is the initial value of the modifier message MM. If this initial value is not the same initial value that was used during encryption of the modifier message MM, then the encryption/decryption process has an error that indicates erroneous message decryption.

As shown in FIG. 19, a multiplexer 250 applies the control bits of the decrypted modifier message MM to a modifier message decoder 252.

After decryption of the modifier message MM, the multiplexer 232 passes the three message segment keys A, B, and C and the three hash values A, B, and C stored in a message segment key memory 254 to the key expander 234. When the modification key message segment MKMS is being decrypted, these three message segment keys are produced with the modification keys having the predetermined value. The key expander expands only the three message segment keys A, B, and C, it does not expand the three hash values A, B, and C. The three expanded message segment keys A, B, and C and the three hash values A, B, and C are used by the second decryption engine 186 to decrypt the modification key message MK1 in the received modification key message segment MKMS. As indicated above, each of the three modification key messages MK1, MK2, and MK3 and the checksum message CRC has the format shown in FIG. 12, and the control of each of the messages is the key control 98 that indicates whether the particular message is a program key message, a modification key message, or a checksum message.

As shown in FIG. 20, the Hash value C is applied to the EXCLUSIVE OR 236, the Hash value B is applied to the EXCLUSIVE OR 238, and the Hash value A is applied to the EXCLUSIVE OR 240. The expanded fixed key C is applied to the AES decrypter 242, the expanded fixed key B is applied to the AES decrypter 244, and the expanded fixed key A is applied to the AES decrypter 246.

The first ¼ of the encrypted modification key message MK1 is applied to the AES decrypter 242, the second ¼ of the encrypted modification key message MK1 is applied to the AES decrypter 246, the third ¼ of the encrypted modification key message MK1 is applied to the AES decrypter 244, and the fourth ¼ of the encrypted modification key message MK1 is applied to the AES decrypter 242.

The AES decrypter 242 supplies half of its decryption result to the EXCLUSIVE OR 236 and the other half as the second ½ of the decrypted modification key MK1. The AES decrypter 244 supplies half of its decryption result to the EXCLUSIVE OR 238 and the other half as the first ½ of the decrypted modification key. The AES encrypter 246 supplies half of its encryption result to the EXCLUSIVE OR 240 and the other half as the control of the decrypted modification key. The output of the EXCLUSIVE OR 240 is the initial value of the modification key message. If this initial value is not the same initial value that was used during encryption of the modification key MK1, then the encryption/decryption process has an error that indicates the need for remedial action.

The decryption engine 186 similarly decrypts the modification key messages MK2 and MK3 and the checksum message CRC. The multiplexer 250 passes the controls and the checksum as indicated in FIG. 19, and passes the modification keys for storage in a modification key memory 256.

Following decryption of the received modification key message segment MKMS, the fixed key selector and message segment key generator 190 can begin generating new message segment keys that will be used to decrypt the programs keys from the next received program key message segment PKMS.

The modifier message decoder 252 decodes the received and decrypted modifier message MM in each of the message segments to determine the addresses according to the modifier message format and definition shown in FIGS. 8 and 9. The fixed key selector 260 uses these addresses to select, from the memory 188, the same three $K_A$ keys, the same three $K_B$ fixed keys, and the same three Hash values A, B, and C that were used to produce the message segment keys A, B, and C that were used to encrypt the message segments PKMS and MKMS in the encryption encoder 8. A first key memory 262 stores the selected three $K_A$ keys, a second fixed key memory 264 stores the selected three fixed $K_B$ keys, and the message segment key memory 254 stores the selected three Hash values A, B, and C.

A message segment key generator 266 may have the same construction as the message segment key generator 90 shown in FIG. 6. Accordingly, the latch 92$_1$ latches the first 32 bits of a first of the three fixed keys $K_A$ stored in the fixed key memory 262, the latch 92$_2$ latches the first 32 bits of a first of the three fixed keys $K_B$ stored in the fixed key memory 264, and the latch 92$_3$ latches the first 32 bits of a first of the three modification keys $K_M$ stored in the modification key memory 256 when message segment keys are being produced to decrypt program keys (otherwise, the modification keys having the predetermined value are used to generate message segment keys to decrypt modification keys). These 96 latched bits form a 96 bit address that reads out the first 32 bits of a first message segment key for storage in the message segment key memory 254.

The same table that was selected in the transmitter is selected in the receiver to provide the three message segment keys that are stored in the message segment key memory 254.

After the first 32 bits of the first message segment key are read out of the look up table 94 and are stored in the message segment key memory 254, the latch 92, latches the second 32 bits of the first of the three fixed keys $K_A$ stored in the fixed key memory 262, the latch 92$_2$ latches the second 32 bits of the first of the three fixed keys $K_B$ stored in the fixed key memory 264, and the latch 92$_3$ latches the second 32 bits of the first of the three modification keys $K_M$ stored in the modification key memory 256 when message segment keys are being produced to decrypt program keys (otherwise, the modification keys having the predetermined value are used to generate message segment keys to decrypt modification keys). These 96 latched bits form a second 96 bit address that reads out the second 32 bits of the first message segment key for storage in the message segment key memory 254.

The third and fourth 32 bits of the first of the three fixed keys $K_A$ stored in the fixed key memory 262, of the first of the three fixed keys $K_B$ stored in the fixed key memory 264, and of the first of the three modification keys $K_M$ stored in the modification key memory 256 are used to read out the third and fourth 32 bits of the first message segment key from the look up table 94 when message segment keys are being produced to decrypt program keys (otherwise, the modification keys having the predetermined value are used to generate message segment keys to decrypt modification keys. These third and fourth 32 bits of the first message segment key are also stored in the message segment key memory 254 to form all 128 bits of the first message segment key. The second and third message segment keys are similarly read out of the look up table 94 and stored in the message segment key memory 254.

When the next program key message segment PKMS is received, the modifier message MM in the received message segment MS is decrypted as before using the fixed keys A', B', and C' and the Hash values A', B', and C' stored in the memory 230. Then, the multiplexer 232 passes the three message segment keys A, B, and C and the three Hash values A, B, and C from the message segment key memory 254 through the key expander 234 to the second encryption engine 186. The key expander 234 expands only the message segment keys A, B, and C. The key expander 234 does not expand the Hash values A, B, and C.

In the second encryption engine 186, the Hash value C is applied to the EXCLUSIVE OR 236, the Hash value B is applied to the EXCLUSIVE OR 238, and the Hash value A is applied to the EXCLUSIVE OR 240. The expanded fixed key C is applied to the AES decrypter 242, the expanded fixed key B is applied to the AES decrypter 244, and the expanded fixed key A is applied to the AES decrypter 246.

The first ¼ of the encrypted first program key message KM1 is applied to the AES decrypter 242, the second ¼ of the encrypted first program key message KM1 is applied to the AES decrypter 246, the third ¼ of the encrypted first program key message KM1 is applied to the AES decrypter 244, and the fourth ¼ of the encrypted first program key message KM1 is applied to the AES decrypter 242.

The AES decrypter 242 decrypts the first ¼ and the fourth ¼ of the encrypted first program key message KM1 message according to the expanded fixed key C, and supplies half of the decryption result to the EXCLUSIVE OR 236 and the other half as the second ½ of the first program key of the decrypted first program key message KM1. The AES decrypter 244 decrypts an output of the EXCLUSIVE OR 236 and the third ¼ of the encrypted first program key message KM1 according to the expanded fixed key B, and supplies half of the decryption result to the EXCLUSIVE OR 238 and the other half as the first ½ of the first program key of the decrypted first program key message KM1. The AES encrypter 246 decrypts an output of the EXCLUSIVE OR 238 and the second ¼ of the encrypted first program key message KM1 according to the expanded fixed key A, and supplies half of the encryption result to the EXCLUSIVE OR 240 and the other half as the control of the decrypted first program key message KM1. The output of the EXCLUSIVE OR 240 is the initial value of the first program key message KM1. If this initial value is not the same initial value as was used during encryption of the first program key message KM1, then the encryption/decryption process has an error that indicates the need for remedial action.

The other three program key messages KM2, KM3, and KM4 are similarly decrypted.

The multiplexer 250 of FIG. 19 passes these four program keys to the next portion of the memory 192 and passes the control of each of the decrypted program key messages KM1, KM2, KM3, and KM4.

A multiplexer 270 passes the active program keys, using the rotation discussed above in relation to FIGS. 15 and 16, through a key expander 272 to the decryption block 210 so that the appropriate data can be decrypted. The key expander 272 may be constructed in accordance with FIG. 4. As in the case of key expander 70, the key expander 272 also includes an inverse key block. This inverse key block is disabled during program decryption and is enabled during decryption of the program key message segment PKMS and the modification key message segment MKMS.

While the active keys from the active portion of the memory 192 are being used by the decryption block 210 to decrypt data, the next program keys are received and stored in the next portion of the memory 192.

The modifier message decoder 252 also decodes the full system control of the received and decrypted modifier message MM. As discussed above, the system control of the modifier message MM is shown in FIG. 9. Accordingly, the modifier message decoder 252 applies the same CRC code as the encoder to bits 0-15 of the system control of the modifier message MM in the received message segment PKMS or MKMS in order to recalculate the checksum bits 16-31. The receiver compares the recalculated checksum from bits 0-15 to the checksum bits 16-31 in the received system control. If the recalculated ckecksum from bits 0-15 and the received checksum bits 16-31 do not match, the received message segment is treated as the next message segment expected to be received in the sequence of received message segments.

Also, the modifier message decoder 252 uses the decoded bits 12-15 of the system control to determine the program key rotation that should be used by the decryption block 210 to decrypt the encrypted program packets as shown by the line extending from the modifier message decoder 252 to the control of the multiplexer 270 which selects the next active key to be used.

Certain modifications of the present invention have been discussed above. Other modifications of the present invention will occur to those practicing in the art of the present invention. For example, the memories as described above may be ROMs, RAMs, non-volatile RAMs, and/or any other suitable memory devices.

Furthermore, as disclosed above, a 96×32 look up table 94 is used to produce the message segment keys. Accordingly, 96 address bits are used to read 32 bits of a message segment key. Instead, other look up tables and addressing schemes may be used to produce the message segment keys. For example, a 384×128 look up table can be used to produce the message segment keys. Accordingly, 384 address bits comprising 128 $K_M$ bits, 128 $K_A$ bits, and 128 $K_B$ bits are used to read a 128 bit message segment key. Whichever look up table and addressing scheme is used in the transmitter, the same look up table and addressing scheme should be used in the receiver.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method of decrypting an encrypted program received in an MPEG transport stream comprising:
   receiving an MPEG transport stream including a series of MPEG packets, said MPEG packets including a plurality of encrypted program packets and at least one MPEG packet containing a key;
   decrypting the encrypted program packets based on the key;
   replacing the received MPEG packet that contains the key in the MPEG transport stream with a null packet; and
   forwarding the received MPEG transport stream containing the null packet in place of the MPEG packet containing the key.

2. The method of claim 1 wherein the key comprises an encrypted key, and wherein the decrypting of the encrypted program based on the key comprises:
   decrypting the key; and,
   decrypting the encrypted program based on the decrypted key.

3. A method of decrypting an encrypted program received in an MPEG transport stream comprising:
   receiving an MPEG transport stream including a series of MPEG packets said MPEG packets including a plurality of encrypted program packets and at least one MPEG packet containing a key;
   decrypting the encrypted packets based on the key;
   replacing the received MPEG packet that contains the key in the MPEG transport stream with a null packet;
   forwarding the received MPEG transport stream containing the null packet in place of the MPEG packet containing the key;
   wherein the key comprises an encrypted key,
   wherein the decrypting of the encrypted program based on the key comprises:
   decrypting the key; and,
   decrypting the encrypted program based on the decrypted key;
   wherein the key comprises a first key,
   wherein the MPEG packet containing the key includes an address, and
   wherein the step of decrypting of the key comprises:
   reading a second key from a memory in accordance with the address; and,
   decrypting the first key in accordance with the second key.

4. The method of claim 3 wherein the decrypting of the first key in accordance with the second key comprises:
   generating a third key in accordance with the second key; and,
   decrypting the first key in accordance with the third key.

5. A method of decrypting an encrypted program received in an MPEG transport stream comprising:
   receiving a series of MPEG packets in the MPEG transport stream, said series of MPEG packets including a first message, wherein the first message contains a first key;
   retrieving the first key from the first message;
   replacing the first message in the received MPEG transport stream with a first null packet;
   receiving a second message in the received MPEG transport stream, wherein the second message includes a second key;
   retrieving the second key from the second message;
   replacing the second message in the received MPEG transport stream with a second null packet;
   decrypting the encrypted program based on the first and second keys; and
   forwarding the series of received MPEG packets of the MPEG transport stream without the first and second messages and with the first and second null packets in place of the first and second messages.

6. The method of claim 5 wherein the received second key is encrypted, and wherein the decrypting of the encrypted program based on the first and second keys comprises:
   decrypting the second key based on the first key; and,
   decrypting the encrypted program based on the decrypted second key.

7. A method of decrypting an encrypted program received in an MPEG transport stream comprising:
   receiving a series of MPEG packets in the MPEG transport steam, said series of MPEG packets including a first message, wherein the first message contains a first key;
   replacing the first message in the received MPEG transport steam with a first null packet;
   receiving a second message in the received MPEG transport stream, wherein the second message includes a second key;
   replacing the second message in the received MPEG transport steam with a second null packet;
   decrypting the encrypted program based on the first and second keys; and
   forwarding the series of received MPEG packets of the MPEG transport stream without the first and second messages and with the first and second null packets in place of the first and second messages;
   wherein the received second message further includes an address,
   wherein the received second key is encrypted, and
   wherein the decrypting of the encrypted program based on the first and second keys comprises:

reading a third key from a memory in accordance with the address;
generating a fourth key based on the first and third keys;
decrypting the second key based on the fourth key; and,
decrypting the encrypted program based on the decrypted second key.

8. A method of decrypting an encrypted program received in an MPEG transport steam comprising:
receiving a series of MPEG packets in the MPEG transport steam, said series of MPEG packets including a first message, wherein the first message contains a first key;
replacing the first message in the received MPEG transport stream with a first null packet;
receiving a second message in the received MPEG transport stream, wherein the second message includes a second key;
replacing the second message in the received MPEG transport stream with a second null packet;
decrypting the encrypted program based on the first and second keys; and
forwarding the series of received MPEG packets of the MPEG transport stream without the first and second messages and with the first and second null packets in place of the first and second messages;
wherein the received first message further includes a first address,
wherein the received second message further includes a second address,
wherein the first and second keys are encrypted, and
wherein the decrypting of the encrypted program based on the first and second keys comprises:
reading a third key from a memory in accordance with the first address;
decrypting the first key based on the third key;
reading a fourth key from the memory in accordance with the second address;
decrypting the second key based on the decrypted first key and the fourth key; and,
decrypting the encrypted program based on the decrypted second key.

9. A method of decrypting an encrypted program received in an MPEG transport stream comprising:
receiving a series of MPEG packets in the MPEG transport stream, said series of MPEG packets including a first message, wherein the first message contains a first key;
replacing the first message in the received MPEG transport stream with a first null packet;
receiving a second message in the received MPEG transport stream, wherein the second message includes a second key;
replacing the second message in the received MPEG transport stream with a second null packet;
decrypting the encrypted program based on the first and second keys; and
forwarding the series of received MPEG packets of the MPEG transport stream without the first and second messages and with the first and second null packets in place of the first and second messages;
wherein the received first message further includes a first address,
wherein the received second message further includes a second address,
wherein the first and second keys are encrypted, and
wherein the decrypting of the encrypted program based on the first and second keys comprises:
reading a third key from a memory in accordance with the first address;
generating a fourth key based on the third key and a fifth key, wherein the fifth key is not received and is not based on a received address;
decrypting the first key based on the fourth key;
reading a sixth key from the memory in accordance with the second address;
generating a seventh key based on the decrypted first key and the sixth key;
decrypting the second key based on the seventh key; and,
decrypting the encrypted program based on the decrypted second key.

10. A method of decrypting an encrypted program received in an MPEG transport stream comprising:
receiving a series of MPEG packets in the MPEG transport stream, said series of MPEG packets including a first message, wherein the first message contains a first key;
replacing the first message in the received MPEG transport stream with a first null packet;
receiving a second message in the received MPEG transport stream, wherein the second message includes a second key;
replacing the second message in the received MPEG transport stream with a second null packet;
decrypting the encrypted program based on the first and second keys; and
forwarding the series of received MPEG packets of the MPEG transport stream without the first and second message and the first and second null packets in place of the first and second messages;
wherein the received first message further includes a first address,
wherein the first address is encrypted,
wherein the received second message further includes a second address,
wherein the second address is encrypted,
wherein the first and second keys are encrypted, and
wherein the decrypting of the encrypted program based on the first and second keys comprises:
reading a third key from a memory not based on a received address;
decoding the first address based on the third key;
reading a fourth key from the memory in accordance with the decoded first address;
generating a fifth key based on the fourth key and a sixth key, wherein the sixth key is not received and is not based on a received address;
decrypting the first key based on the fifth key;
reading a seventh key from the memory not based on a received address;
decoding the second address based on the seventh key;
reading an eighth key from the memory in accordance with the decoded second address;
generating a ninth key based on the decrypted first key and the eighth key;
decrypting the second key based on the ninth key; and,
decrypting the encrypted program based on the decrypted second key.

11. A method of decrypting an encrypted program received in an MPEG transport stream comprising:
receiving a series of MPEG packets in the MPEG transport stream, the MPEG transport stream including a first message, wherein the first message contains a key;
retrieving the key from the first message;
replacing the first message in the received MPEG transport stream with a first null packet;

receiving a second message in the received MPEG transport stream, wherein the second message initiates decryption of the encrypted program by use of the key;

replacing the second message in the received MPEG transport stream with a second null packet, and forwarding the received MPEG transport stream with the first and second null packets in place of the first and second messages.

12. The method of claim 11 wherein the key comprises an encrypted first key, and wherein the method further comprises:

receiving a second key in a third message prior to receiving the first message;

decrypting the first key between receipt of the first and second messages.

13. A method of decrypting an encrypted program received in an MPEG transport stream comprising:

receiving a series of MPEG packets in the MPEG transport stream, the MPEG transport stream including a first message, wherein the first message contains a key;

replacing the first message in the received MPEG transport stream with a first null packet;

receiving a second message in the received MPEG transport stream, wherein the second message initiates decryption of the encrypted program by use of the key;

replacing the second message in the received MPEG transport stream with a second null packet, and forwarding the received MPEG transport stream with the first and second null packets in place of the first and second messages;

wherein the key comprises a first key, and wherein the method further comprises:

receiving a second key in a third message prior to receiving the first message;

decrypting the first key between receipt of the first and second message;

wherein the received third message further includes an address, wherein the received second key is encrypted, and wherein the method further comprises:

reading a third key from a memory in accordance with the address;

decrypting the second key based on the third key.

* * * * *